Sept. 3, 1968     S. M. SALOMON     3,399,770
METHOD FOR CENTRIFUGAL SEPARATION OF PARTICLES FROM A MIXTURE
Filed Jan. 19, 1966     2 Sheets-Sheet 2
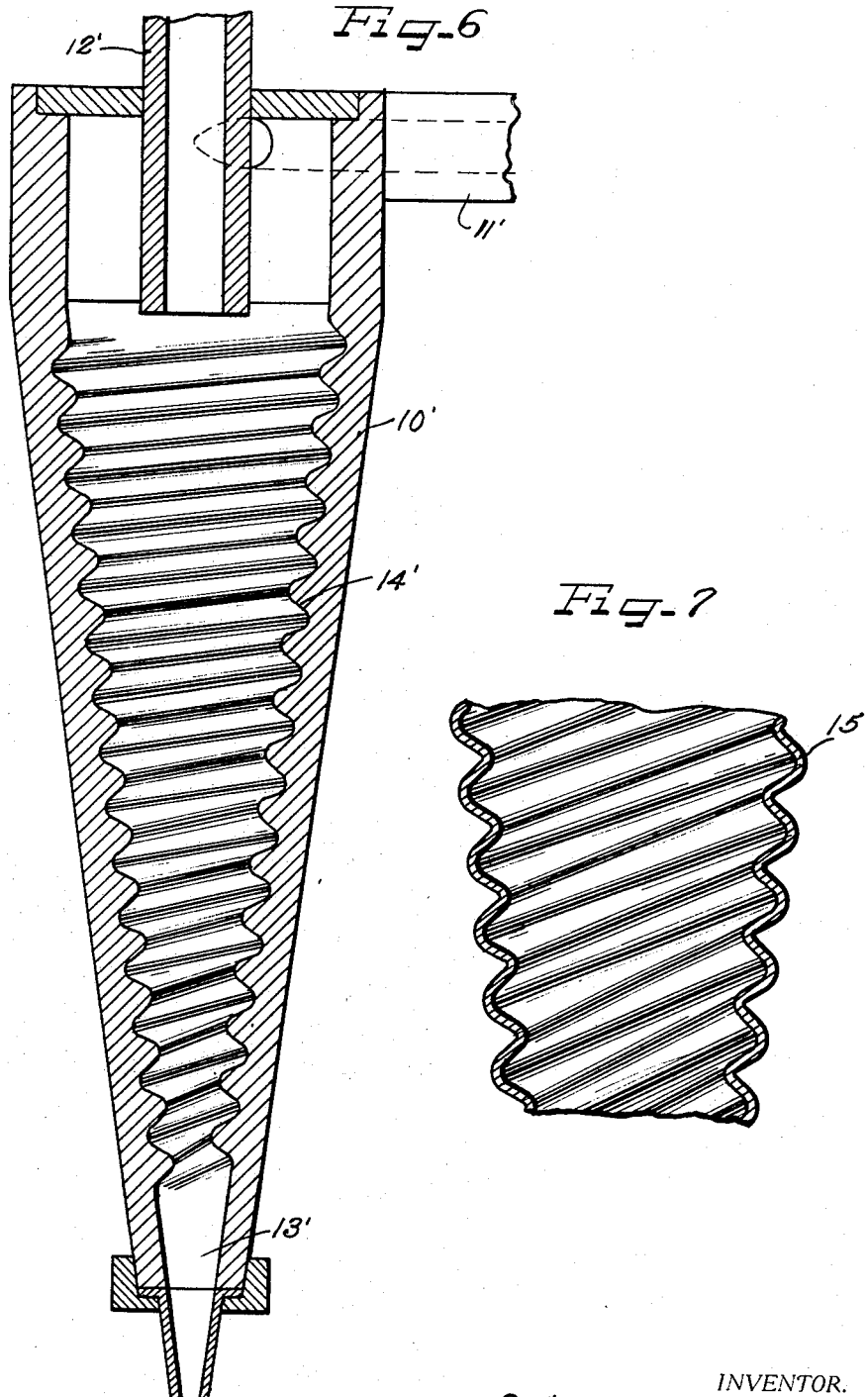
INVENTOR.
Salomon M. Salomon United States Patent Office 3,399,770
Patented Sept. 3, 1968

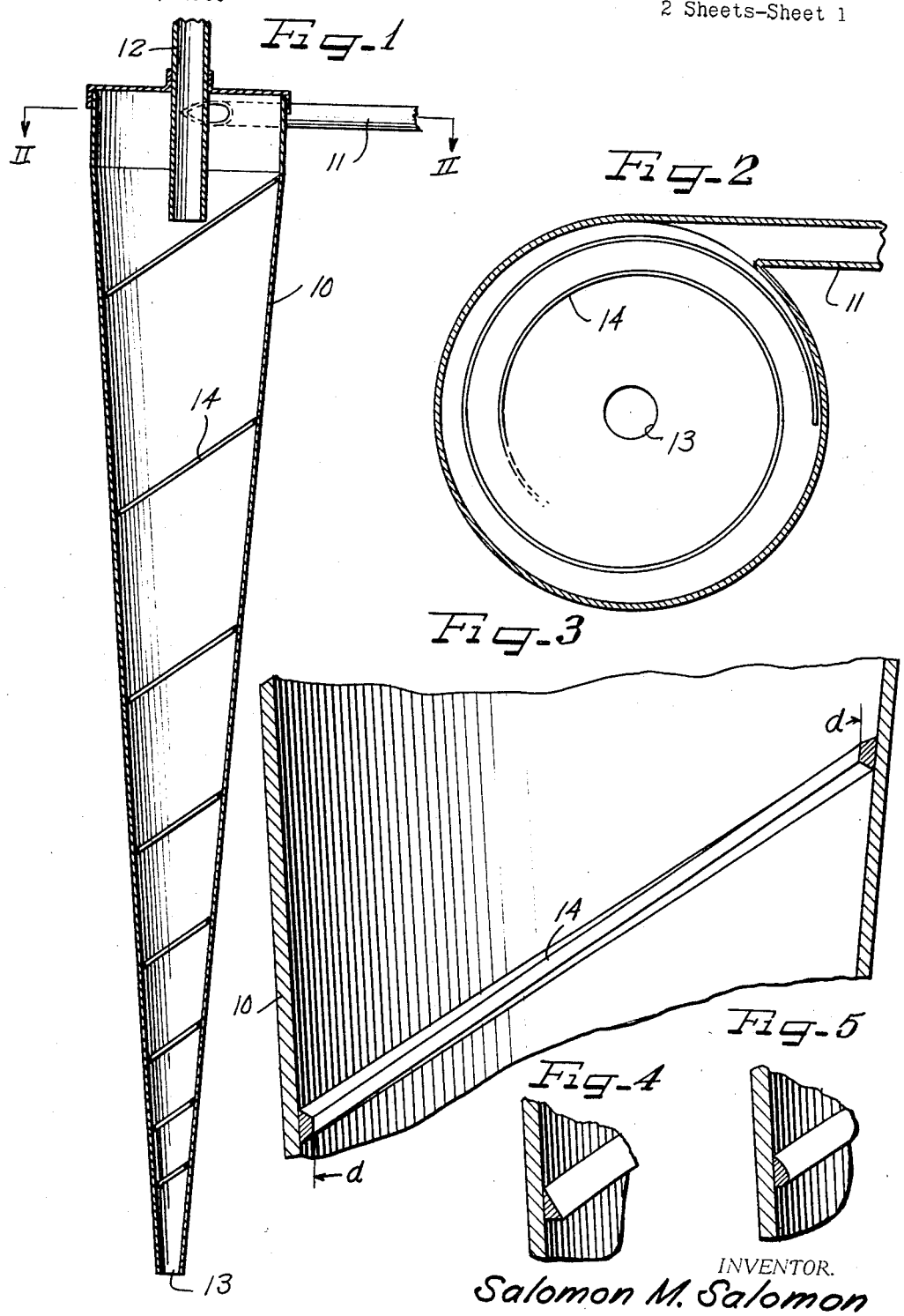

3,399,770
METHOD FOR CENTRIFUGAL SEPARATION OF PARTICLES FROM A MIXTURE
Salomon M. Salomon, Madison, Wis., assignor to Beloit Corporation, Beloit, Wis., a corporation of Wisconsin
Filed Jan. 19, 1966, Ser. No. 521,685
1 Claim. (Cl. 209—211)

ABSTRACT OF THE DISCLOSURE

Method for removing impurities from a pulp suspension. A stream of the pulp suspension is introduced tangentially into the larger end of a conical chamber. An outlet for removal of the suspension with the impurities removed is provided at the larger end of the chamber and another outlet for removal of the impurities is provided at the smaller end of the chamber. The impurities move to the wall of the chamber due to centrifugal force, and helical flutes winding from the larger to the smaller end are formed on the surface of the chamber wall to direct or guide the impurities to the outlet at the smaller end of the chamber.

---

The present invention relates to a method for centrifugal separation of particles from a mixture such as the purification of paper pulp by the removal of sand, grit, bark and foreign particles.

Presently used centrifugal separators embody a conical chamber having a tangential input for introducing into the chamber a liquid suspension having particles to be removed. A typical example of such a separator is shown in U.S. Patent 2,377,524 to Samson et al.

The liquid suspension is introduced into the tangential input under pressure at a relatively high velocity. Due to the shape of the conical chamber, the suspension is whirled in a lateral or axial direction along the inner wall of the chamber, thereby producing a vortical whirl of this substance. Consequently, centrifugal force causes the lighter particles, the particles to be purified, to move toward the center of the vortex; and the heavier particles, the impurties, to move against the wall of the chamber. As a result, the lighter particles are forced to return in an opposite direction toward the larger end of the chamber within the center of the vortex. The result of this entire operation is to cause the heavier particles to be removed through an outlet at the apex of the chamber into normal air pressure; and, the lighter or purified particles removed at an outlet of the larger end of the chamber.

The heavier particles frequently do not follow the vortical whirl but remain in an animated suspension, such that the heavier particles move along the wall of the chamber in a continuous closed path without moving in an axial direction. These particles encounter buoyancy forces as well as axial entrainment forces. However, due to the size and weight of certain particles, these forces are equal and opopsite. As a result, the particle remains in animated suspension and does not move axially but circles against the chamber wall and cuts into the surface of the chamber wall which necessitates repair of the chamber or even replacement thereof.

Accordingly it is an object of the present invention to provide an improved method and means for centrifugal separation which avoids the disadvantages of the prior art, and which insures uniform and proficient carrying away of particles trapped by equal axial forces remaining in animated suspension.

A feature of the invention is to provide a helical fluting connected to the inner wall of the chamber for providing means for mechanically directing the particle to the outlet at the apex of the chamber.

Other objects, advantages and features will become more apparent with the teaching of the principles of the present invention in connection with the disclosure of the preferred embodiment thereof in the specification, claims and drawings, in which:

FIGURE 1 is an axial section through a centrifugal separator;
FIGURE 2 is a sectional view taken along lines II—II of FIGURE 1;
FIGURE 3 is a detailed view of a section of fluting as shown in FIGURE 1;
FIGURES 4 and 5 are detailed views of sections of fluting having modified cross-sectional areas;
FIGURE 6 is an axial section through a modified centrifugal separator in accordance with the principles of the present invention; and
FIGURE 7 is a portion of another modified form of a centrifugal separator.

As shown on the drawings:
In the preferred embodiment of the invention, the centrifugal separator is used for the purification of pulp fibers used in the manufacture of paper. There are impurities which must be removed such as bulk particles, shives and resins. The pulp and its associated impurities suspended in solution with water are forced into the conical chamber 10 via the inlet 11.

A vortical whirl results due to the shape of the chamber and also the pressure of suspension. The impurities being the heavier particles are affected the most by tangential forces, thereby causing these impurities to travel along the walls of the conical chamber 10. The lighter fibrous materials are affected to a lesser extent and, therefore, are carried in an opposite direction within the center of the vortex toward the outlet 12 at the larger end of the conical chamber 10. The lighter particles are forced out of outlet 12 due to the pressure of the liquid suspension. The heavier particles continue on down the sides of the walls of the conical chamber 10 and are removed via outlet 13 at the apex of the chamber. Therefore, the impurities are withdrawn from the chamber via the outlet 13.

FIGURE 2 clearly shows an inlet 11 which introduces the suspension in a tangential direction for causing the vortical whirl.

In the course of purification and separation of the impurities from the fibrous pulp, a single particle of the impurities oftentimes enters a state of animated suspension, i.e., travels in a circular path along the inner wall of the conical chamber 10 without advancing in an axial direction. This particle is held in suspension by entrainment and buoyancy forces. The buoyancy forces are acting upon this particle which tends to counteract the entrainment forces which tend to move the particle axially maintaining the particle in suspension. Therefore, the particle merely continues to move at the same level. Centrifugal force is also acting upon the particle so that the particle is held against the inner wall of the chamber 10 and moves along the wall in a closed circular path. As a result, such a particle travels against the inner wall and abrasively cuts into the surface thereof. The wall of the chamber 10 must eventually be repaired or replaced due to action of these particles.

FIGURE 1 shows helical fluting 14 connected by any suitable method such as welding to the inner wall of the conical chamber 10 for removing a particle from animated suspension. The helical fluting 14 extends axially along the inner wall of the chamber (preferably at a uniform lead). The fluting extends from a point above the bottom of the outlet 12 to at least as far as a critical distance above outlet 13.

It is a practice in the art for pulp cleaners that the diameter of the conical chamber at its widest circumference should be about 3 inches or less. Therefore, the helical fluting 14 should extend a distance d, from the surface of the wall to the edge of the fluting, equal to a maximum of ½ inch. The minimum length of distance d, should be equal to the effective radius of the largest particles.

FIGURE 2 shows the helical fluting 14 as it spirals from the inlet 11 to a point near the outlet 13. FIGURE 3 is a detailed view of a section of the helical fluting 14 as shown more generally in FIGURE 1.

The helical fluting 14 directs a particle and transmits it toward the outlet 13. Once a particle starts to follow a circular path in animated suspension it will then eventually come into contact with the helical fluting 14 as the particle moves in a circular path along the inner wall of the chamber 10. Therefore, the buoyancy forces are overcome as the particle contacts the helical fluting 14. The circling entrainment forces are still effective, however, to thereby cause the particle to follow the helical path of the fluting 14. The particle is then removed via the outlet 13.

Once the particle reaches the critical depth, it will continue in an axial direction without the aid of the helical fluting 14. This critical depth depends upon the dimensions of the particular conical chamber because the particles do not enter animated suspension in the proximate vicinity of the outlet at the apex. The length of this critical depth is between 5 and 20 times the diameter of the discharge nozzle at the apex.

FIGURES 4 and 5 are alternative embodiments for helical fluting 14, showing different shapes thereof in cross-section.

Referring now to FIGURE 6, a modified form of the centrifugal separator as shown in FIGURE 1 is illustrated. The centrifugal separator 10' has a helical-shaped groove in the inside surface of the walls thereof. This helical groove accomplishes the same function as the helical fluting as mentioned above. The groove 14' is formed by undercutting the wall.

Referring now to FIGURE 7, a wall 15 having a substantially constant cross-sectional thickness for defining a conically shaped chamber of a centrifugal separator is also provided with a groove in accordance with the principles of the present invention to accomplish the same results as the fluting or groove as mentioned above. This corrugated shape of the wall 15 may be constructed from a suitable metal forming process by spinning the metal into a corrugated shape. The thickness of the wall 15 is constant but follows a helical contour.

As to any or all of the various forms and modifications of the present invention as described above, it is understood that a single, as well as a multiple lead spiral, may be used as the directing means for directing entrained particles from animated suspension. Also, the depth and the pitch of the helical directing means is primarily a function of the impurities to be removed, the size of the centrifugal separator, and the concentration or consistency of the material to be purified.

Thus, it will be seen that I have provided an improved centrifugal separator which meets the objectives, advantages and features above set forth. The unit is well suited for removing particles from animated suspension from within a centrifugal separator.

The drawing and specification present a detailed disclosure of the preferred embodiment of the invention, and it is to be understood that the invention is not limited to the specific form disclosed, but covers all modifications, changes in alternative constructions and methods falling within the scope of the principles taught by the invention.

I claim as my invention:

1. A method of removing from a pulp suspension impurities of nearly the same centrifugal force reaction as the pulp fibers which comprises the steps of, introducing a continuous stream of the suspension tangentially into the larger end of a conically-shaped peripherally-fluted chamber to provide a vortex including a whirling motion in the suspension in an elongated conical path toward the smaller end of the chamber and then freely in an opposite axial direction within the conical path, the flutes at the periphery of the chamber positively directing particles of the impurities along the periphery of said conical path in a helical direction toward the smaller end of the chamber, continually withdrawing a fraction of the suspension containing particles of impurities from a point adjacent the smaller end of the chamber, returning the balance of the suspension constituting the major fraction of the original stream adjacent the axis of the vortex toward the larger end of the chamber, and continually withdrawing at least a part of said major portion from a point adjacent the larger end of said chamber.

References Cited

UNITED STATES PATENTS

| | | | |
|---|---|---|---|
| 471,272 | 3/1892 | Morse | 209—144 X |
| 601,355 | 3/1898 | Paterson | 209—144 X |
| 630,309 | 8/1899 | Aberg | 210—512 X |
| 762,867 | 6/1904 | Allen | 210—512 X |
| 1,666,477 | 4/1928 | Stebbins | 209—144 X |
| 1,822,006 | 9/1931 | Bull | 210—304 |
| 2,198,819 | 4/1940 | Holm | 210—304 |
| 2,377,524 | 6/1945 | Samson et al. | 209—211 |
| 2,678,731 | 5/1954 | Reinsch | 210—512 |
| 2,768,745 | 10/1956 | Albertson | 209—211 |
| 3,010,579 | 11/1961 | Duesling | 209—211 |

FOREIGN PATENTS 668,014  11/1938  Germany.

REUBEN FRIEDMAN, *Primary Examiner.*

J. ADEE, *Assistant Examiner.*